United States Patent
Chang

(10) Patent No.: US 8,423,200 B2
(45) Date of Patent: Apr. 16, 2013

(54) SYSTEM AND METHOD FOR COOLING AN ELECTRONIC DEVICE WITH MULTIPLE FANS

(75) Inventor: Yao-Ting Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 339 days.

(21) Appl. No.: 12/978,657

(22) Filed: Dec. 27, 2010

(65) Prior Publication Data

US 2012/0035782 A1   Feb. 9, 2012

(30) Foreign Application Priority Data

Aug. 6, 2010   (TW) ............................. 99126199 A

(51) Int. Cl.
*G06F 19/00* (2006.01)
*F24F 7/06* (2006.01)

(52) U.S. Cl.
USPC ....... 700/300; 361/679.48; 361/678; 361/695

(58) Field of Classification Search .................. 700/299, 700/300; 361/679.48, 678, 695
See application file for complete search history.

(56) References Cited

U.S. PATENT DOCUMENTS

| | | | |
|---|---|---|---|
| 6,936,767 B2 * | 8/2005 | Kleinecke et al. ............. | 174/50 |
| 7,432,819 B2 * | 10/2008 | Kleinecke et al. ............ | 340/679 |
| 7,483,270 B2 * | 1/2009 | Blake ....................... | 361/679.48 |
| 7,708,056 B2 * | 5/2010 | Shen et al. .................... | 165/247 |
| 2003/0039095 A1 * | 2/2003 | Paradis ......................... | 361/687 |
| 2008/0024977 A1 * | 1/2008 | Coglitore et al. ............. | 361/687 |
| 2008/0274686 A1 * | 11/2008 | Kupferberg et al. .......... | 454/244 |
| 2008/0306635 A1 * | 12/2008 | Rozzi ............................ | 700/300 |
| 2009/0299531 A1 * | 12/2009 | Kitamura et al. ............. | 700/275 |
| 2010/0294385 A1 * | 11/2010 | Nitta et al. ................. | 137/565.3 |

FOREIGN PATENT DOCUMENTS

EP   1284344 A2 *   2/2003

OTHER PUBLICATIONS

"Case Fans: Should you worry about positive or negative pressure?", Igor Wallossek, tomshardware.com. Printed from http://www.tomshardware.com/reviews/cooling-air-pressure-heatsink,3058-5.html, Nov. 2011.*

* cited by examiner

*Primary Examiner* — Michael D Masinick
(74) *Attorney, Agent, or Firm* — Altis Law Group, Inc.

(57) ABSTRACT

An electronic device and a method for controlling heat reflux of the electronic device include setting a speed decrease value and standard temperatures for each of the first device and the second device. The control method further includes detecting a working temperature of the second device using a temperature sensor of the electronic device, if a speed of the second fan is at a full speed. The control method further includes reducing a speed of the first fan according to the speed decrease value, if the speed of the second fan is at the full speed and the detected working temperature exceeds the standard temperature of the second device.

15 Claims, 4 Drawing Sheets

A

B

SYSTEM AND METHOD FOR COOLING AN ELECTRONIC DEVICE WITH MULTIPLE FANS

BACKGROUND

1. Technical Field

Embodiments of the present disclosure relate to a control method, and in particular, to a system and method for cooling an electronic device.

2. Description of Related Art

In a cooling system of an electronic device (e.g. a computer or a server), if performance of a fan in the electronic device cannot work normally (referred to as "an abnormal fan" for simplification), normal fans may impair ventilation efficiency of the abnormal fan, and the abnormal fan may be unable to withstand negative pressure generated by other normal fans. Therefore, the abnormal fan may generate heat reflux, and the normal fans may intake hot air of the heat reflux from the abnormal fan. The cooling system of the electronic device is thus non-effective.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
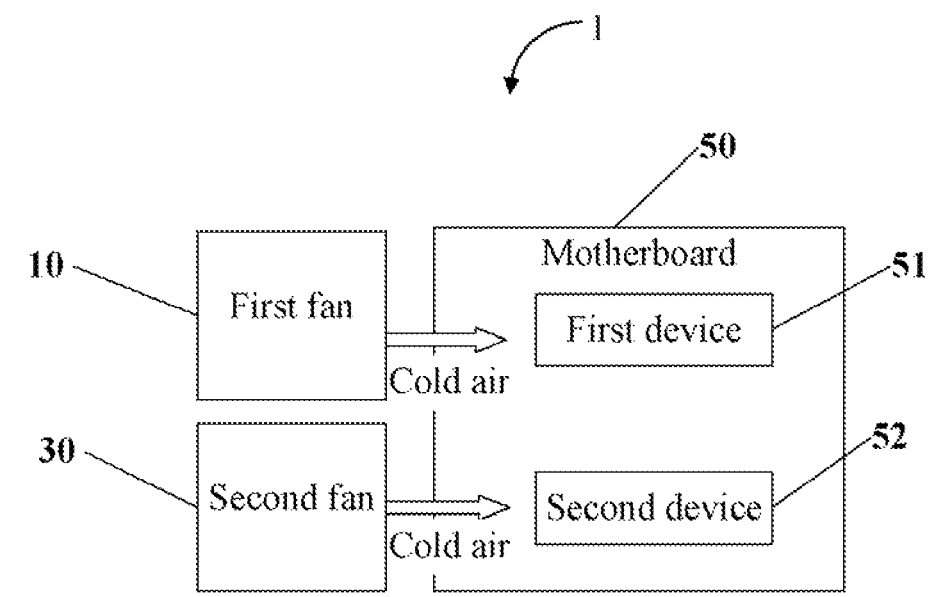
FIG. 1A and FIG. 1B are schematic diagrams of a first embodiment of an electronic device.
Figure 1:
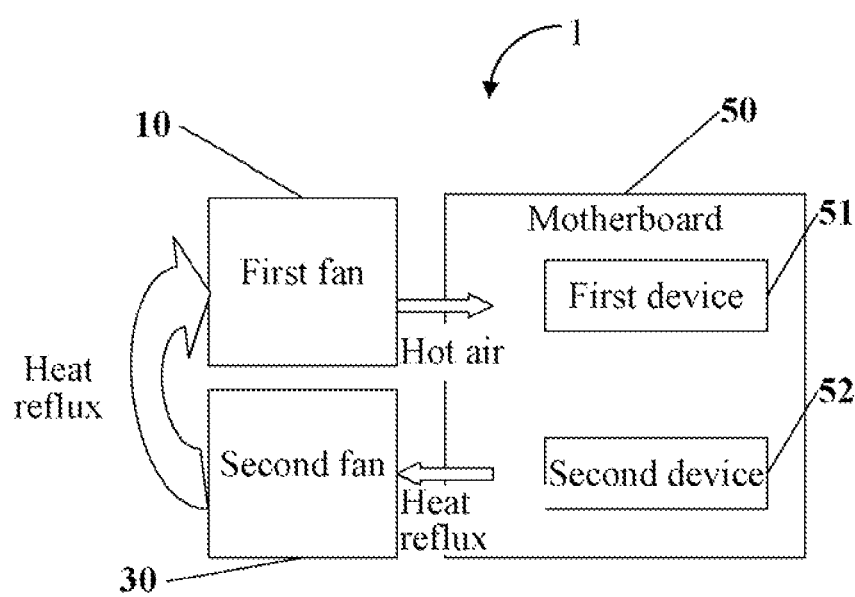

FIG. 1 is a schematic diagram of a first embodiment of an electronic device 1. The electronic device 1 includes a first fan 10, a second fan 30 and a motherboard 50. The motherboard 50 includes a first device 51 and a second device 52. In FIG. 1A, the first fan 10 may be used to cool the first device 51, and the second fan 30 may be used to cool the second device 52. In some embodiments, the first device 51 and second device 52 may be a central processing unit, a hard disk drive, or a storage device. In FIG. 1B, if dissipation efficiency of the second fan 30 is low, and the second fan 30 is unable to withstand negative pressure given by the first fan 10, the second fan 30 may generate heat reflux. The first fan 10 may raise temperature of the first device 51 by intaking hot air from the heat reflux of the second fan 30. Thus, a cooling system of the electronic device 1 non-effective.

Figure 2:
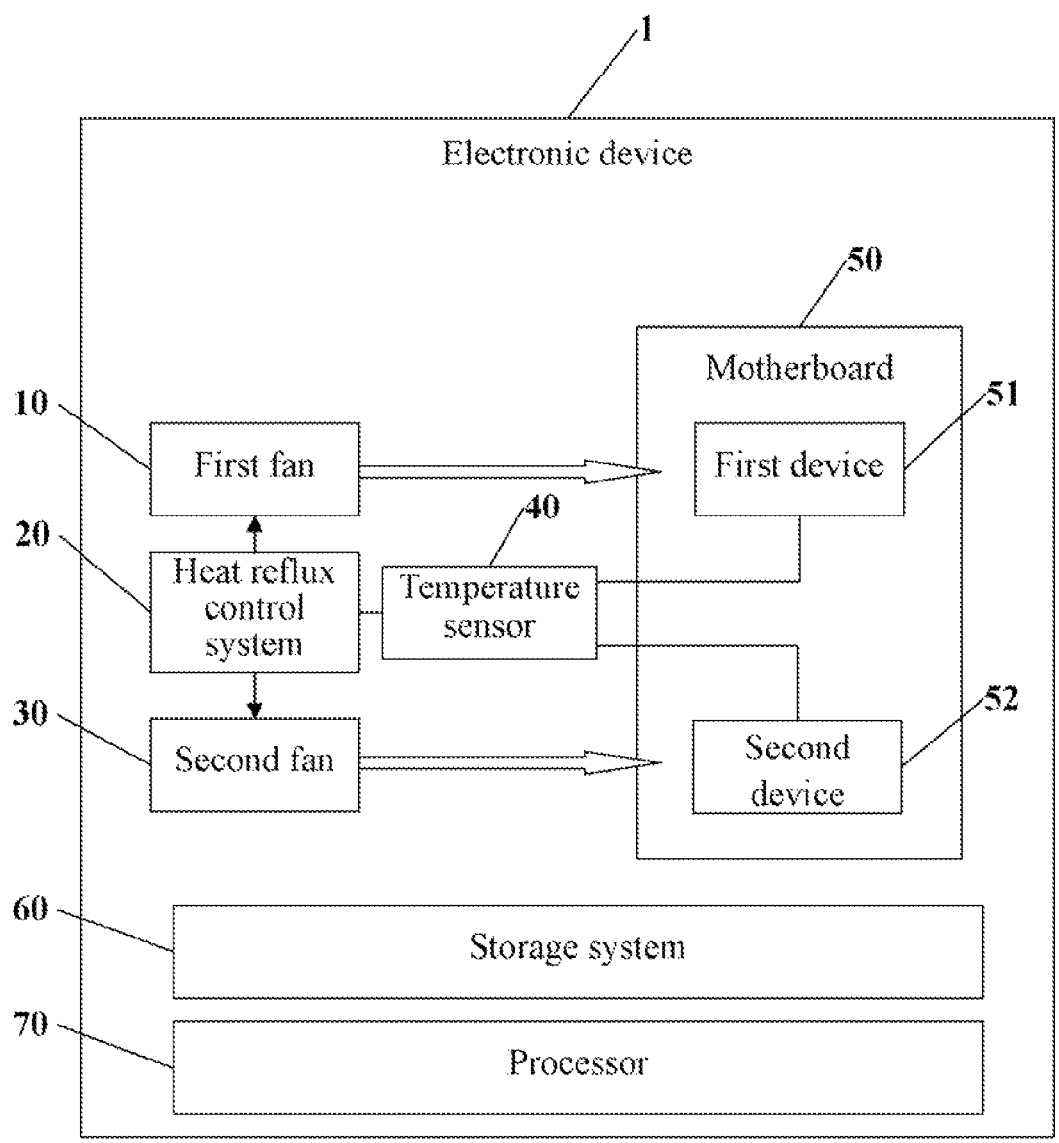
FIG. 2 is a schematic diagram of a second embodiment of an electronic device including a heat reflux control system.

FIG. 2 is a schematic diagram of a second embodiment of the electronic device 1 including a heat reflux control system 20. As mentioned, the electronic device 1 also includes the first fan 10, the second fan 30, and the motherboard 50, which includes the first device 51 and second device 52. In the second embodiment, the electronic device 1 further includes a temperature sensor 40. A normal fan indicates that dissipation efficiency of a fan is operational. An abnormal fan represents that the dissipation efficiency of the fan is insufficient. The heat reflux control system 20 may control a speed of the normal fan in the electronic device 1, to regulate temperature of a device cooled by the abnormal fan, and avoid the heat reflux. The electronic device 1 may be a computer, a notebook, or a server, for example. As mentioned above, the first device 51 and second device 52 also may be a central processing unit, a hard disk drive, or a storage device. The temperature sensor 40 may connect the first device 51 and second device 52, to detect working temperatures thereof.

The electronic device 1 further includes a storage system 60, and at least one processor 70. The storage system 60 may be a memory of the electronic device 1, and may be an external storage card, such as a smart media (SM) card, or a secure digital (SD) card. The at least one processor 70 executes one or more computerized codes of the electronic device 1 and other applications, to provide the functions of the electronic device 1.

Figure 3:
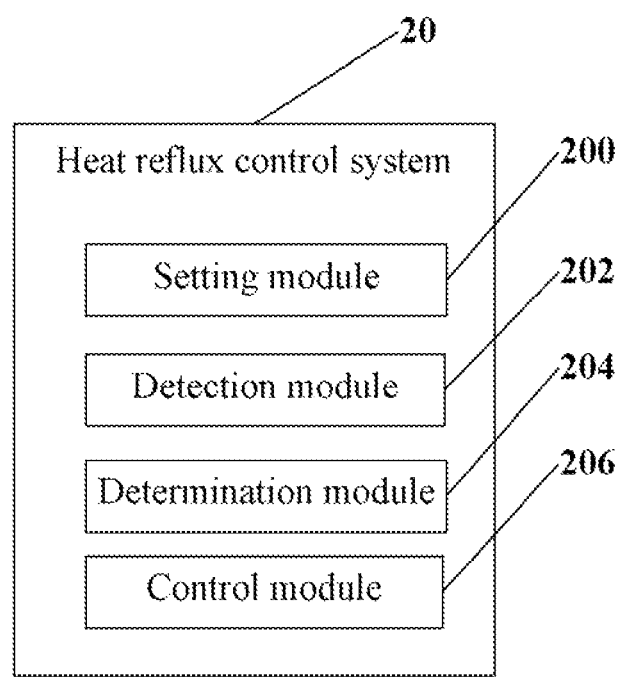
FIG. 3 is a block diagram of one embodiment of the heat reflux control system of FIG. 2.

FIG. 3 is a block diagram of one embodiment of the heat reflux control system 20 of FIG. 2. In some embodiments, the heat reflux control system 20 includes a setting module 200, a detection module 202, a determination module 204, and a control module 206. The modules 200, 202, 204, and 206 may comprise computerized code in the form of one or more programs that are stored in the storage system 60. The computerized code includes instructions that are executed by the at least one processor 70 to provide functions for modules 200, 202, 204, and 206. In some embodiments, the first fan 10 is regarded as the normal fan, the second fan 30 is regarded as the abnormal fan. Details of these operations follow.

The setting module 200 sets a speed decrease value, and sets a standard temperature for each of the first device 51 and the second device 52. The speed decrease value may be 5%, for example. In some embodiments, if a working temperature of the first device 51 or the second device 52 is lower than or equal to the corresponding standard temperature of the first device 51 or the device 5, the first device 51 or the second device 52 may de determined to work normally. If the working temperature of the first device 51 or the second device 52 exceeds the corresponding standard temperature of the first device 51 or the second device 52, the first device 51 or the second device 52 may be determined to be working abnormally, such as, generating heat reflux, for example.

The detection module 202 detects a speed of the second fan 30 (the abnormal fan). The speed is represented with a duty cycle. In some embodiments, the detection module 202 may detect the speed of the second fan 30 according to a value of the duty cycle in a speed instruction sent to the second fan 30 by the electronic device 1. For example, a basic input/output system (BIOS) (not shown in FIG. 2) of the electronic device 1 may send the speed instruction of "Duty cycle=20%" to the second fan 30. The detection module 202 may detect that the speed of the second fan 30 is 20% value of the duty cycle.

The determination module 204 determines whether the detected speed of the second fan 30 is at a full speed. In some embodiments, the full speed is represented with 100% of the duty cycle.

The detection module 202 further detects the working temperature of the second device 52 using the temperature sensor 40, when the speed of the second fan 30 is at the full speed.

The determination module 204 further determines whether the detected working temperature of the second device 52 exceeds the standard temperature of the second device 52.

If the detected working temperature exceeds the standard temperature of the second device, the second fan 30 may generate heat reflux, and the control module 206 reduces the speed of the first fan 10 according to the speed decrease value until the detected working temperature is lower than or equal to the standard temperature of the second device 52. Therefore, the second fan 30 is able to withstand the first fan 10 diverting airflow. In some embodiments, the control module 206 may reduce the value of the duty cycle in the speed instruction sent to the first fan 10, to reduce the speed of the first fan 10. The control module 206 further maintains the speed of the first fan 10, if the detected working temperature is lower than or equal to the standard temperature of the second device 52.

Figure 4:
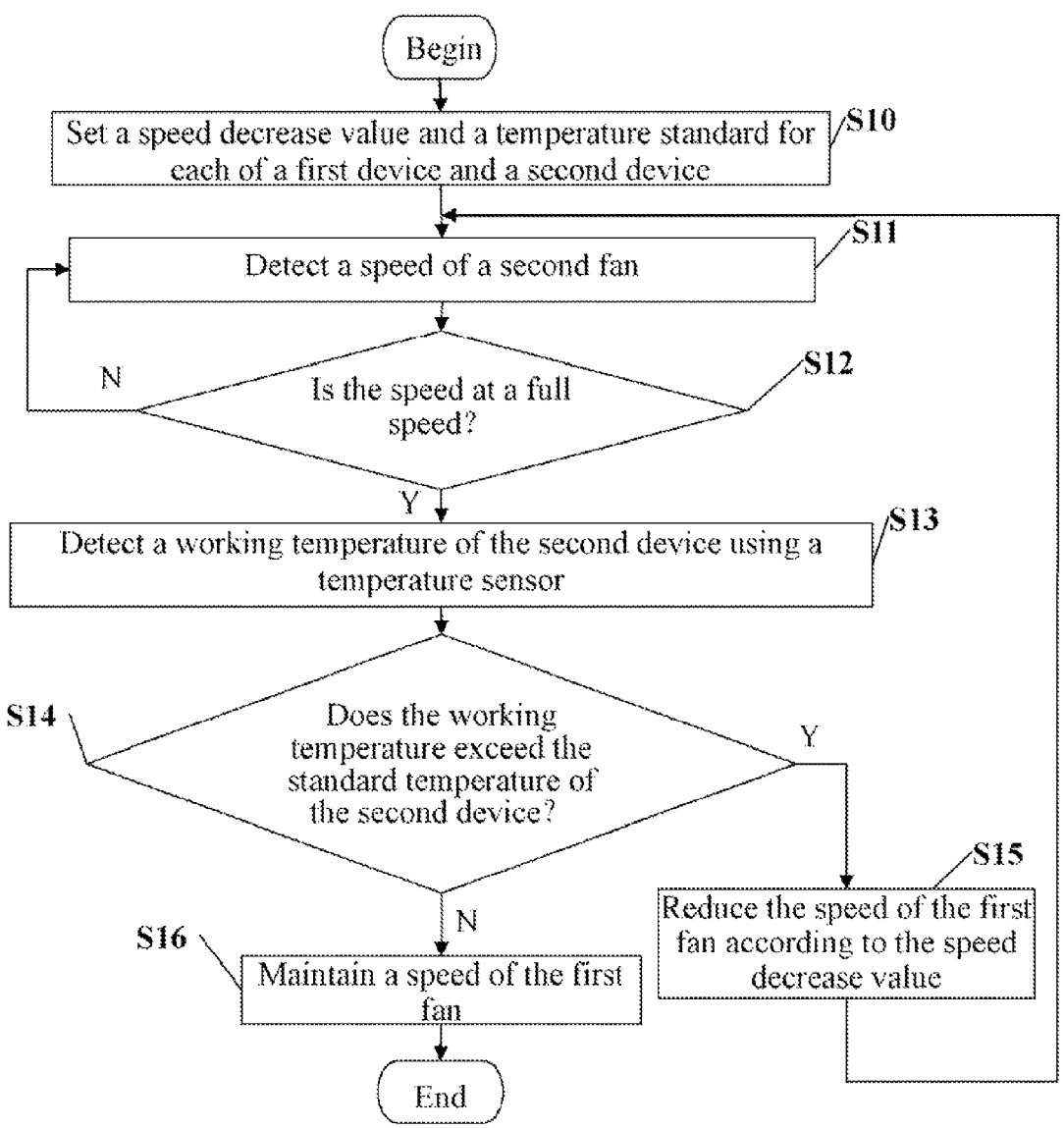
FIG. 4 is a flowchart of one embodiment of a method for controlling heat reflux in an electronic device of FIG. 2.

FIG. 4 is a flowchart of one embodiment of a method for controlling heat reflux of the electronic device of FIG. 2. Depending on the embodiment, additional blocks may be added, others removed, and the ordering of blocks may be changed.

In block S10, the setting module 200 sets a speed decrease value, and sets a standard temperature for each of the first device 51 and the second device 52.

In block S11, the detection module 202 detects a speed of the second fan 30. In some embodiments, the detection module 202 may detect the speed of the second fan 30 according to a value of the duty cycle in a speed instruction sent to the second fan 30 by the electronic device 1.

In block S12, The determination module 204 determines whether the detected speed of the second fan 30 is at a full speed. In some embodiments, the full speed is represented with 100% of the duty cycle. If the detected speed of the second fan 30 is at the full speed, block S13 is implemented. If the detected speed of the second fan 30 is not at the full speed, block S11 is repeated.

In block S13, the detection module 202 further detects the working temperature of the second device 52 using the temperature sensor 40.

In block S14, The determination module 204 further determines whether the detected working temperature of the second device 52 exceeds the standard temperature of the second device 52. If the detected working temperature of the second device 52 exceeds the standard temperature of the second device 52, block S15. If the detected working temperature of the second device 52 is lower than or equal to the standard temperature of the second device 52, block S16 is implemented.

In block S15, the control module 206 reduces a speed of the first fan 10 according to the speed decrease value, and block S13 is repeated, until the detected working temperature is lower than or equal to the standard temperature of the second device 52.

In block S16, the control module 206 maintains the speed of the first fan 10.

It should be emphasized that the described exemplary embodiments are merely possible examples of implementations, and set forth for a clear understanding of the principles of the present disclosure. Many variations and modifications may be made to the-described exemplary embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. An electronic device, comprising:
    a first fan to cool a first device of the electronic device;
    a second fan to cool a second device of the electronic device;
    a temperature sensor;
    a storage system;
    at least one processor; and
    one or more programs stored in the storage system, executable by the at least one processor, the one or more programs comprising:
        a setting module operable to set a speed decrease value, and set a standard temperature for each of the first device and the second device;
        a detection module operable to detect a speed of the second fan, detect a working temperature of the second device using the temperature sensor, in response that the speed of the second fan is at a full speed;
        a determination module operable to determine whether the detected working temperature of the second device exceeds the standard temperature of the second device;
        a control module operable to reduce a speed of the first fan according to the speed decrease value until the detected working temperature is lower than or equal to the standard temperature of the second device, when the speed of the second fan is at the full speed and the detected working temperature exceeds the standard temperature of the second device.

2. The electronic device as claimed in claim 1, wherein the control module is further operable to maintain the speed of the first fan, upon the condition that the speed of the second fan is at the full speed and the detected working temperature is lower than or equal to the standard temperature of the second device.

3. The electronic device as claimed in claim 1, wherein the speed is represented with a duty cycle, and the full speed is represented with 100% value of the duty cycle.

4. The electronic device as claimed in claim 3, wherein:
    the detection module detects the speed of the second fan according to the value of the duty cycle in a speed instruction sent to the second fan by the electronic device, and
    the control module reduces the value of the duty cycle in the speed instruction sent to the first fan, to reduce the speed of the first fan.

5. The electronic device as claimed in claim 1, wherein the first device and the second device are one of a central processing unit, a hard disk drive and a storage device.

6. A computer-implemented method for cooling an electronic device, the electronic device comprising a first fan to cool a first device of the electronic device, and a second fan to cool for a second device of the electronic device, the method comprising:
    setting a speed decrease value, and set a standard temperature for each of the first device and the second device;
    detecting a speed of the second fan;
    detecting a working temperature of the second device using a temperature sensor of the electronic device, in response that the speed of the second fan is at a full speed;
    determining whether the detected working temperature of the second device exceeds the standard temperature of the second device;
    reducing a speed of the first fan according to the speed decrease value until the detected working temperature is lower than or equal to the standard temperature of the second device, upon the condition that the speed of the second fan is at the full speed and the detected working temperature exceeds the standard temperature of the second device, 7. The method as claimed in claim 6, wherein the method further comprises:
maintaining the speed of the first fan, upon the condition that the speed of the second fan is at the full speed and the detected working temperature is lower than or equal to the standard temperature of the second device.

8. The method as claimed in claim 6, wherein the speed is represented with a duty cycle, and the full speed is represented with 100% value of the duty cycle.

9. The method as claimed in claim 8, wherein the method further comprises:
detecting the speed of the second fan, according to the value of the duty cycle in a speed instruction sent to the second fan by the electronic device, and
reducing the value of the duty cycle in the speed instruction sent to the first fan, to reduce the speed of the first fan.

10. The method as claimed in claim 6, wherein the first device and the second device are one of a central processing unit, a hard disk drive and a storage device.

11. A storage medium storing a set of instructions, the set of instructions capable of executed by a processor to perform a method for cooling an electronic device, the electronic device comprising a first fan to cool a first device of the electronic device, and a second fan to cool a second device of the electronic device, the method comprising:
setting a speed decrease value, and set standard temperature for each of the first device and the second device;
detecting a speed of the second fan;
detecting a working temperature of the second device using a temperature sensor of the electronic device, in response that the speed of the second fan is at a full speed;
determining whether the detected working temperature of the second device exceeds the standard temperature of the second device;
reducing a speed of the first fan according to the speed decrease value until the detected working temperature is lower than or equal to the standard temperature of the second device, when the speed of the second fan is at the full speed and the detected working temperature exceeds the standard temperature of the second device.

12. The storage medium as claimed in claim 11, wherein the method further comprises:
maintaining the speed of the first fan, upon the condition that the speed of the second fan is at the full speed and the detected working temperature is lower than or equal to the standard temperature of the second device.

13. The storage medium as claimed in claim 11, wherein the speed is represented with a duty cycle, and the full speed is represented with 100% value of the duty cycle.

14. The storage medium as claimed in claim 13, wherein the method further comprises:
detecting the speed of the second fan according to the value of the duty cycle in a speed instruction sent to the second fan by the electronic device, and
reducing the value of the duty cycle in the speed instruction sent to the first fan to reduce the speed of the first fan.

15. The storage medium as claimed in claim 11, wherein the first device and the second device are one of a central processing unit, a hard disk drive and a storage device.

* * * * *